March 9, 1937.  G. E. MARTIN  2,073,163
HYDRAULIC BRAKE BOOSTER
Filed March 8, 1935  2 Sheets-Sheet 2

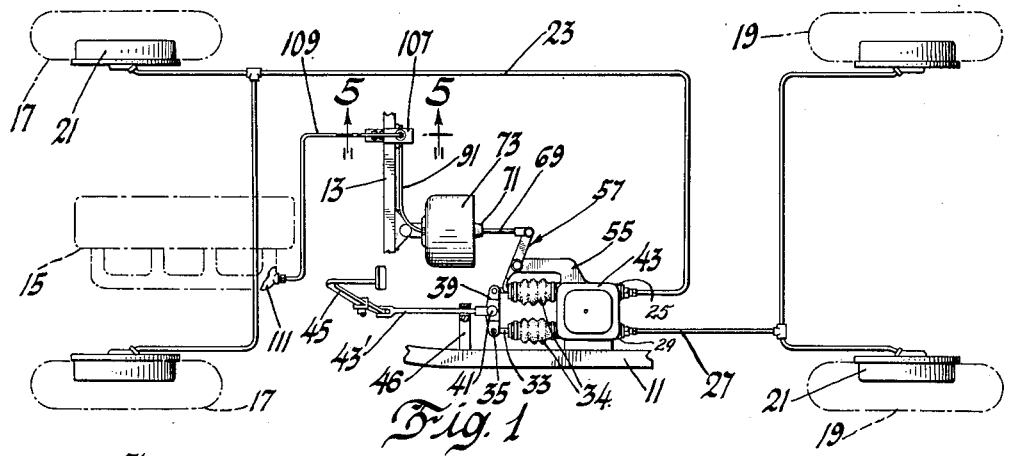
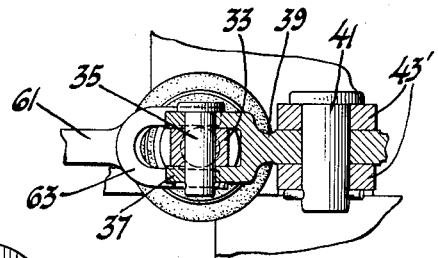
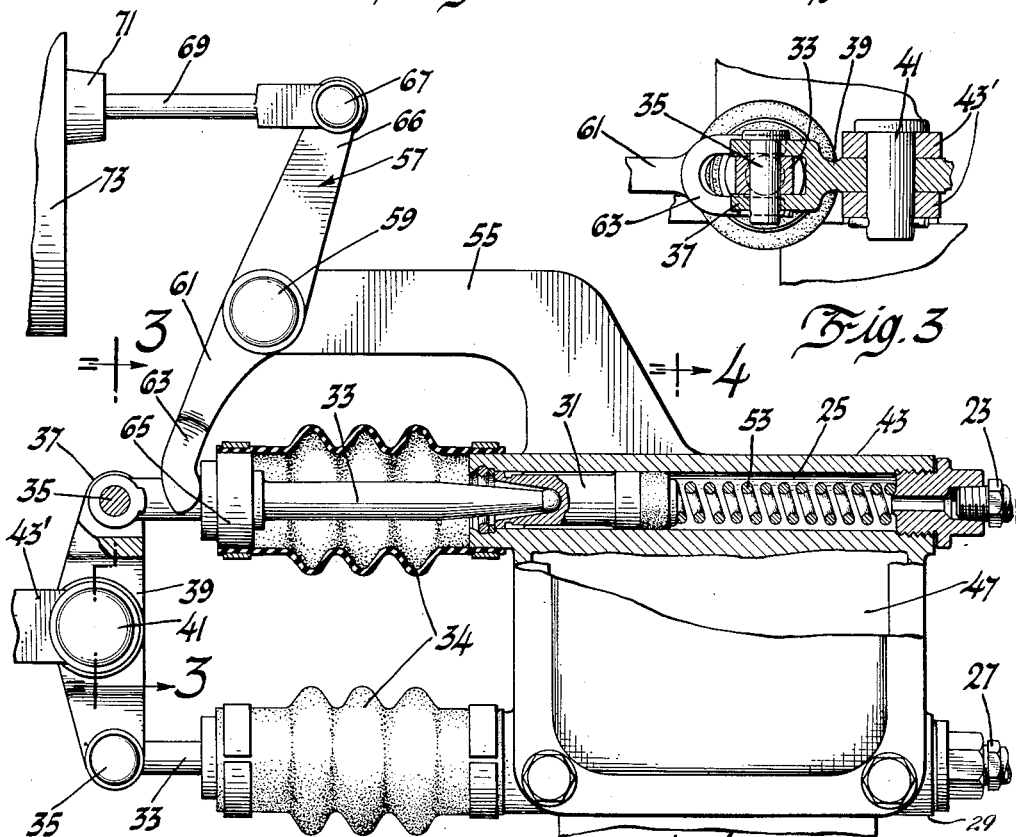

Inventor
George E. Martin
By Blackmore, Spencer & Flint
Attorneys

Patented Mar. 9, 1937

2,073,163

UNITED STATES PATENT OFFICE 2,073,163

HYDRAULIC BRAKE BOOSTER

George E. Martin, Detroit, Mich., assignor to General Motors Corporation, Detroit, Mich., a corporation of Delaware Application March 8, 1935, Serial No. 9,925

4 Claims. (Cl. 188—152)

This invention relates to brakes for vehicles. It has been proposed to arbitrarily divide unequally and in a predetermined ratio the braking forces functioning to retard the rotation of the front wheels and rear wheels respectively. It has been proposed to make that differentiation proportional to the load supported by said front and rear wheels. It is known, however, that under the influence of deceleration there is a shifting of the load from the rear supporting wheels to the front wheels.

It is an object of this invention to provide braking for front and rear in a predetermined ratio, half on each, for example, and automatically to supplement the braking force applied to the front wheels in response to the above described change in loading.

A further object is to provide said supplemental braking by an inertia responsive vacuum servo mechanism.

Other objects and advantages will be understood from the following description.

In the drawings accompanying this description, Fig. 1 is a top plan view of an embodiment of the invention applied to a vehicle.

Fig. 2 is a top plan view, partly in section, of a double master cylinder.

Fig. 3 is a section on line 3—3 of Fig. 2.

Figure 4:
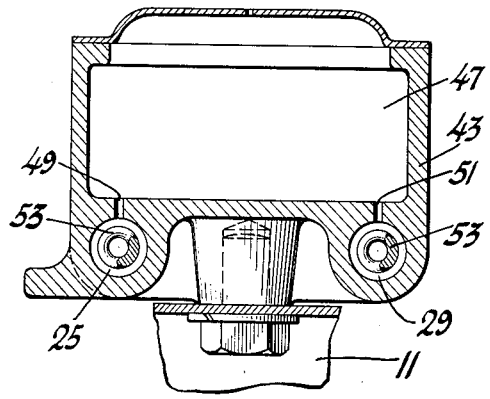
Fig. 4 is a section on line 4—4 of Fig. 2.

Referring to the drawings, 11 represents a longitudinal member constituting a part of a vehicle chassis and 13 is a transverse member. At 15 is shown the engine for driving the vehicle. The front wheels are marked 17 and the rear wheels 19. Each wheel has a brake drum 21. A system of hydraulic conduits 23 connect wheel cylinders (not shown) within the drums of the front wheels with a master cylinder 25. A system of conduits 27 connects a master cylinder 29 with wheel cylinders (not shown) within the drums of the rear wheels. Within the master cylinders are pistons 31 restoring springs 53 and the pistons are actuated by rods 33 with dust protectors 34. The outer ends of the rods are pivoted by pins 35 to the forked ends 37 of an equalizer bar 39. This bar is pivoted at an intermediate point 41 to a rod 43' connected to a lever or pedal 45. The pedal pressure is equally distributed in the form shown, owing to the location of point 41 midway between the ends of bar 39, to the two rods and pistons, thereby applying equal pressures on the fluid columns leading to the front and rear wheel cylinders. Thus, when the load is distributed equally, the pressures to effect deceleration are equal.

The cylinders 25 and 29 are located within a casting 43 as shown by Figs. 2 and 4. This casting is secured in any convenient way to chassis bar 11 as shown by Fig. 1. This bar 11 also has an arm 46 to guide rod 43. The casting 43 has a reservoir chamber 47 above the cylinders 25, 29 and communicating passages 49 and 51. The reservoir and passages are conventional expedients in hydraulic brake systems and need no explanation.

Figure 5:
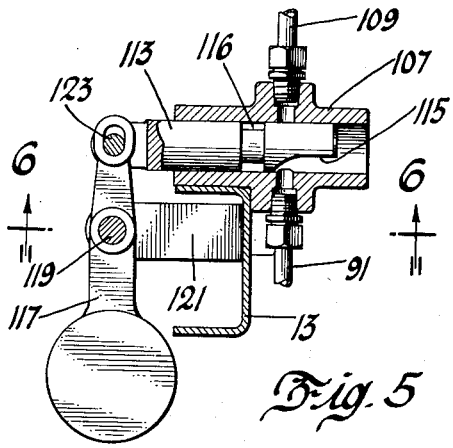
Fig. 5 is a section on line 5—5 of Fig. 1.
Figure 6:
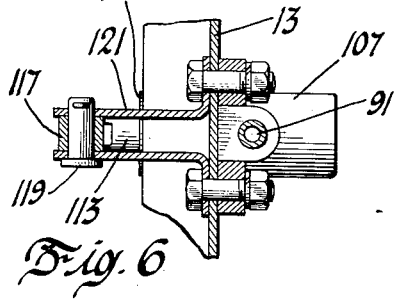
Fig. 6 is a section on line 6—6 of Fig. 5.
Figure 7:
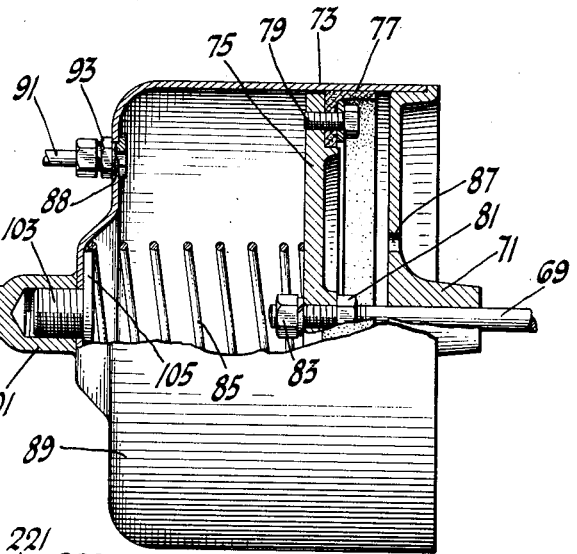
Fig. 7 is a view in elevation, partly in section, of the power cylinder.

An arm 55 is formed on the side of the casting 43 remote from chassis bar 11. It pivots a lever 57 at 59. The arm 61 of lever 57 is forked at 63 and engages a head 65 on the rod 33 associated with the piston of cylinder 25. The other arm 66 of lever 57 is pivoted at 67 to the end of a rod 69 extending into the head 71 of a power cylinder 73. The power cylinder has a piston 75 carrying a cup washer 77 secured by fastening means 79. The rod 69 is secured to the piston by nuts 81 and 83. The piston is biased to the position shown in the drawings by a spring 85. The cylinder has an opening 87 in the head 71 and an opening 88 in the integral closed end 89. A conduit 91 is connected to the cylinder at opening 88 by suitable means 93. The cylinder is anchored to bar 13 by a suitable anchorage including a clip 95 secured at 97 to bar 13, and a fitting 101 secured to the cylinder. The parts 95 and 101 are pivoted together at 99. The fitting engages the cylinder end and has threaded engagement with a fastening device 103 having a head 105 within the cylinder and stem with threads projecting through the wall. The pipe 91 is connected to a valve cylinder 107 also supported on bar 13. From the cylinder 107 and diametrically opposite the opening from pipe 91 is an opening for a pipe 109 connected at its other end to the manifold 111 of engine 15. A valve 113 is reciprocable within cylinder 107. It has a peripheral groove 116 such that in one position of the valve registration is afforded between the conduits 91 and 109. The groove is normally displaced as in Fig. 5 at which time there is no communication between conduits 91 and 109 but pipe 91 is able to vent the power cylinder by means of a recess 115 cut in the valve. This position is normally maintained by a weighted inertia lever 117 pivoted at 119 to an arm 121 extending from frame bar 13. The upper end of lever 117 is pivoted at 123 to the outer end of valve 113, there being a slot at the pivot to provide for the arc of movement of the lever.

The operation is as follows: Depression of pedal 45 presses upon the rod 43', which pressure is divided equally, in the form shown, between the two master cylinders 25 and 27 of the hydraulic brake applying means. When the brakes are so applied deceleration tends to shift some added load to the front wheel supporting means. For best results some added braking should be applied to the front wheel brakes. While at rest or when traveling at a uniform rate, the valve 115 is in the position shown in Fig. 5. Under those conditions there is no communication between pipes 91 and 109 and also the power cylinder 73 is vented through pipe 91 and the recess 115. When deceleration occurs the inertia responsive weighted lever swings and causes the groove 116 to effect registration between pipes 91 and 109, and cuts off the communication between pipe 91 and the air. The manifold suction then serves to withdraw air from the power cylinder to the left of the piston 75. The air pressure on the right side causes the piston to move to the left. This movement operates through rod 69 and lever 57 to impress an added force on piston rod 33 and piston 31 of the front wheel master cylinder. The added pressure is therefore applied to the braking system at the point of support then carrying the greater load. Restoration of the lever 117 cuts off the vacuum servo and vents the cylinder.

Figure 8:
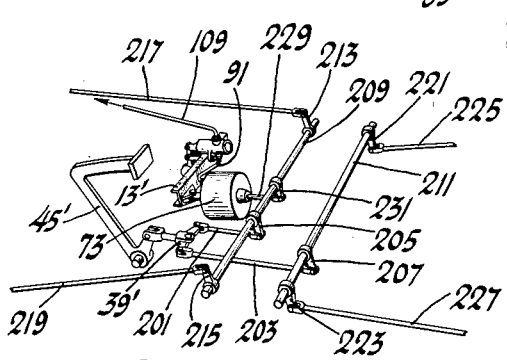
Fig. 8 is a diagrammatic view of a modification.

The expedient is adaptable for mechanical braking as shown in Fig. 8. Here the pedal 45' may be used. It may operate through the equalizer 39'. The equalizer in this case is connected by rods 201 and 203 with arms 205 and 207 on rock shafts 209 and 211. Arms 213, 215 on rock shaft 209 operate front brakes by means of links 217, 219. Arms 221, 223 on rock shaft 211 operate rear brakes by links 225, 227. Cross frame bar 13' is the same as cross bar 13 of Fig. 5 and the valve mechanism and inertia lever mounted on it are also the same. The power cylinder 73 is the same. Its rod 229 is connected to an arm 231 on rock shaft 209 of the front brake system. In this form the brakes are applied mechanically and equally by pedal depression and the vacuum servo supplements the front wheel brake application in an obvious manner.

I claim:

1. In a vehicle, supporting means at the rear, supporting means at the front, braking means associated with each supporting means, mechanism to apply the front and rear braking means in a predetermined ratio, power means, operable in response to the deceleration produced by the action of said braking means, to supplement the total braking force by adding to the force applied to the braking means associated with the front supporting means.

2. The invention defined by claim 1, said mechanism including hydraulic movable columns.

3. The invention defined by claim 1, said mechanism including hydraulic movable columns and said power means including a vacuum servo device comprising a power cylinder and an inertia controlled valve therefor.

4. In a hydraulic brake system for vehicles, front wheel braking means, rear wheel braking means, a plurality of master cylinders, conduit means from each master cylinder to one only of said braking means, means to apply all said braking means through the joint action of said master cylinders, power means to supplement said braking action, said power means comprising a source of fluid pressure, a valve, a power cylinder, said power cylinder operable upon the master cylinder for the front wheel braking means only and an inertia responsive weight operable to move said valve under the influence of the deceleration produced by said first mentioned braking.

GEORGE E. MARTIN.